US012679666B2

(12) United States Patent
Tanaka et al.

(10) Patent No.: US 12,679,666 B2
(45) Date of Patent: Jul. 14, 2026

(54) ARTICLE TRANSPORT FACILITY

(71) Applicant: Daifuku Co., Ltd., Osaka (JP)

(72) Inventors: Yoshitaka Tanaka, Hinocho (JP);
Daisuke Ogawa, Hinocho (JP);
Kenshin Hashiguchi, Hinocho (JP);
Akira Suzuki, Hinocho (JP); **Ayaka
Kawanami, Hinocho (JP); Toshihito
Ueda, Hinocho (JP); Shota Inden**,
Hinocho (JP)

(73) Assignee: Daifuku Co., Ltd., Osaka (JP)

( * ) Notice: Subject to any disclaimer, the term of this
patent is extended or adjusted under 35
U.S.C. 154(b) by 88 days.

(21) Appl. No.: 18/674,059

(22) Filed: May 24, 2024

(65) Prior Publication Data

US 2024/0391702 A1    Nov. 28, 2024

(30) Foreign Application Priority Data

May 25, 2023    (JP) ................................. 2023-086054

(51) Int. Cl.
B65G 47/06        (2006.01)
B61L 27/30        (2022.01)
B65G 47/64        (2006.01)

(52) U.S. Cl.
CPC .................................... B65G 47/64 (2013.01)

(58) Field of Classification Search
CPC ................................ B65G 47/64; B61L 27/30

USPC ............................................... 701/19, 23, 24
See application file for complete search history.

(56)                References Cited

U.S. PATENT DOCUMENTS

| | | | | |
|---|---|---|---|---|
| 8,768,545 | B2 * | 7/2014 | Ikeya ...................... | B61B 10/02 |
| | | | | 701/19 |
| 10,604,351 | B2 * | 3/2020 | Takahara ............ | H01L 21/6773 |
| 11,952,026 | B2 * | 4/2024 | Harasaki .......... | H01L 21/67727 |
| 12,025,989 | B2 * | 7/2024 | Kitamura .............. | G05D 1/693 |
| 12,051,325 | B2 * | 7/2024 | Gun ...................... | G01S 13/865 |

FOREIGN PATENT DOCUMENTS

JP            2006313463 A      11/2006

* cited by examiner

*Primary Examiner* — Douglas A Hess
(74) *Attorney, Agent, or Firm* — The Webb Law Firm

(57)                ABSTRACT

An article transport facility includes transport vehicles, a
travel route which the travel vehicles travel, and a region
control device. The travel route includes branching and
merging region that includes a branching point and a merg-
ing point. If a transport vehicle is scheduled to pass through
a branching point and then pass through a merging point
while passing through a branching and merging region, a
region control device gives the transport vehicle occupation
permission for a first target point on a scheduled travel route
and occupation permission for a second target point on a
non-scheduled travel route, the first target point and the
second target point being whichever one of an occupation
target point and a secondary occupation target point is
closest to the branching point.

5 Claims, 7 Drawing Sheets

Fig.2

ARTICLE TRANSPORT FACILITY

CROSS-REFERENCE TO RELATED APPLICATION

This application claims priority to Japanese Patent Application No. 2023-086054 filed May 25, 2023, the disclosure of which is hereby incorporated by reference in its entirety.

BACKGROUND OF THE INVENTION

1. Field of the Invention

The present invention relates to an article transport facility that includes transport vehicles that transport articles, a travel route along which the transport vehicles travel, and a region control device that controls the transport vehicles in a predetermined branching and merging region.

2. Description of Related Art

An example of such an article transport facility is disclosed as a transport cart system in JP 2006-313463A (Patent Document 1). In the following description of the related art, the symbols shown in parentheses are those used in Patent Document 1.

In the system disclosed in Patent Document 1, lock points are provided at intersections where portions of the travel route of transport vehicles (5) intersect each other, zones each including a lock point are set (hereinafter, called "intersection zones"), and whether or not a transport vehicle (5) is permitted to pass at a lock point is determined for a zone as a whole.

Before a transport vehicle (5) enters an intersection zone in which a lock point is provided, the transport vehicle (5) issues, to a zone controller (11), a blocking request for prohibiting another transport vehicle (5) from entering the intersection zone. If the zone controller (11) permits the transport vehicle (5) that issued the blocking request to pass through the intersection zone, blocking permission is given, and the other transport vehicle (5) is prohibited from passing. With such a configuration, it is possible to avoid interference between the transport vehicles (5) in the intersection zone. After the transport vehicle (5) passes, the zone controller (11) cancels the blocking in the intersection zone so as to enable accepting the other transport vehicle (5).

As described above, in the intersection zone, a plurality of transport vehicles (5) compete with each other for the zone. Only the transport vehicle (5) that has been given occupation permission for the zone is allowed to pass, and the passage of other transport vehicles (5) is restricted. Thus, in an intersection zone, a transport vehicle (5) is subjected to a constraint arising from the relationship with another transport vehicle (5). However, if the constraint is too strict, the traveling of the transport vehicles (5) may be hindered more than necessary, and thus the transport efficiency of the facility as a whole may decrease.

SUMMARY OF THE INVENTION

In view of the aforementioned circumstances, there is desire to improve the transport efficiency of an article transport facility as a whole.

The following are aspects of technology for solving the foregoing problem.

An article transport facility according to an aspect includes:

a transport vehicle configured to transport an article;

a travel route along which the transport vehicle is travelable; and a region control device configured to control the transport vehicle in a predetermined branching and merging region including a branching point where a portion of the travel route branches and a merging point where portions of the travel route merge, the travel route including:

an occupation target point, for which occupation permission is to be given to the transport vehicle, at least downstream of the merging point; and a secondary occupation target point, for which occupation permission is secondarily given to the transport vehicle, between the branching point and the merging point in the travel route, wherein in response to the transport vehicle being scheduled to sequentially pass through the branching point and pass through the merging point while passing through the branching and merging region, the region control device gives the transport vehicle (i) occupation permission for a first target point on a scheduled travel route, which branches from the branching point and is to be traveled by the transport vehicle after passing through the branching point, and (ii) occupation permission for a second target point on a non-scheduled travel route, which branches from the branching point in a different direction from the scheduled travel route, the first target point and the second target point each being whichever one of the occupation target point and the secondary occupation target point is closest to the branching point.

According to this configuration, when the transport vehicle is scheduled to pass through the branching and merging region, for both the scheduled travel route and the non-scheduled travel route that branch from the branching point in different directions, the region control device gives the transport vehicle occupation permission for whichever one of the occupation target point and the secondary occupation target point is closest to the branching point. Accordingly, it is possible to reduce the number of zones for which occupation permission is given to the transport vehicle in the branching and merging region, and when another transport vehicle is scheduled to pass through the branching and merging region, an occupiable zone can be more easily ensured for the other transport vehicle. Therefore, it is easier to enable a plurality of transport vehicles to pass through the branching and merging region at the same time. In this way, according to the above configuration, it is possible to increase the degree of freedom of travel of the transport vehicles in a zone where portions of the travel route intersect each other, and to improve the transport efficiency of the article transport facility as a whole.

Further features and advantages of the technology according to the present disclosure will become clearer from the following description of illustrative and non-limiting embodiments given with reference to the drawings.

BRIEF DESCRIPTION OF THE DRAWINGS

FIG. 2 is a control block diagram.

DESCRIPTION OF THE INVENTION

Hereinafter, embodiments of an article transport facility will be described with reference to the drawings.

Figure 1:
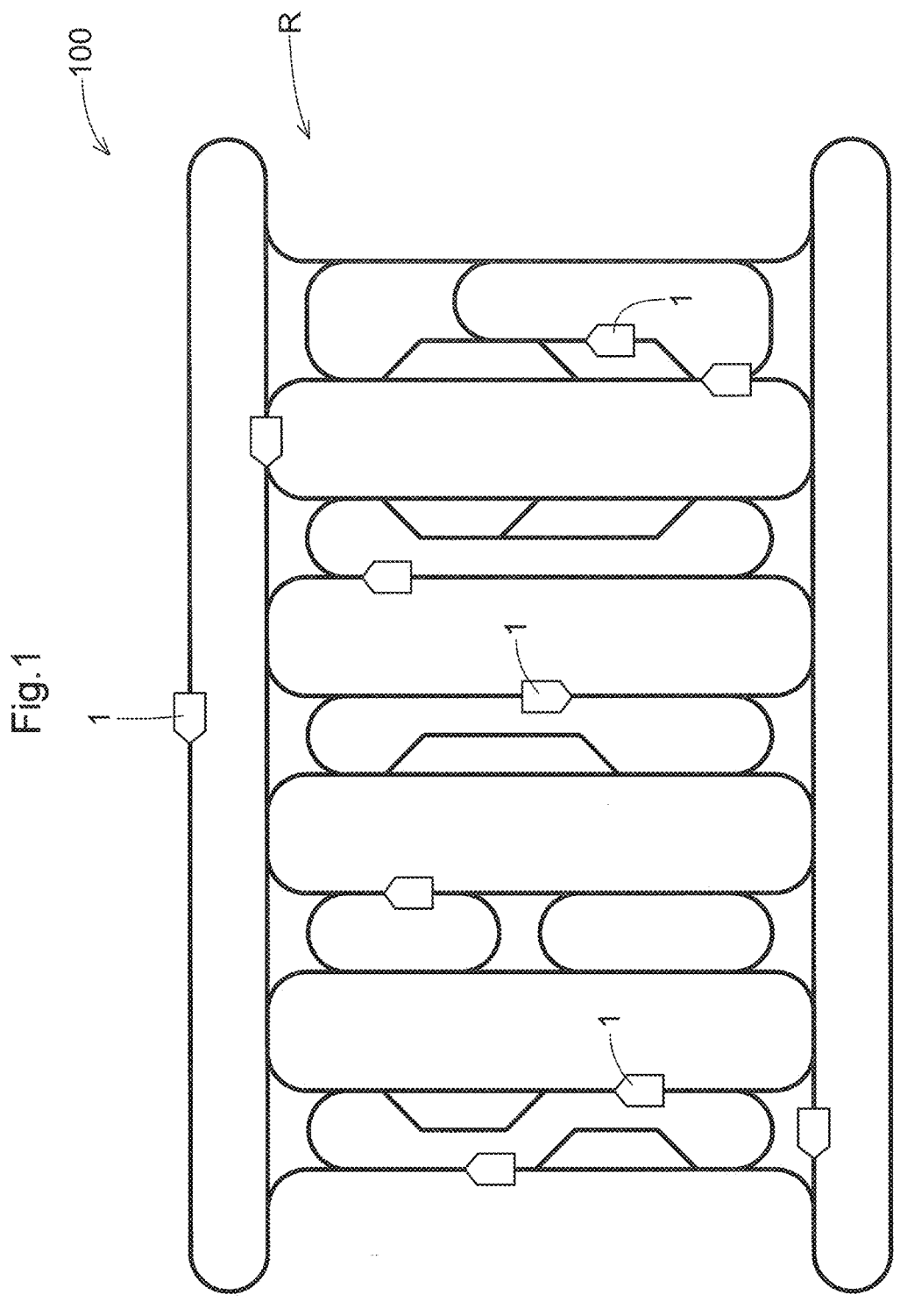
FIG. 1 is a plan view of an article transport facility.
Figure 2:
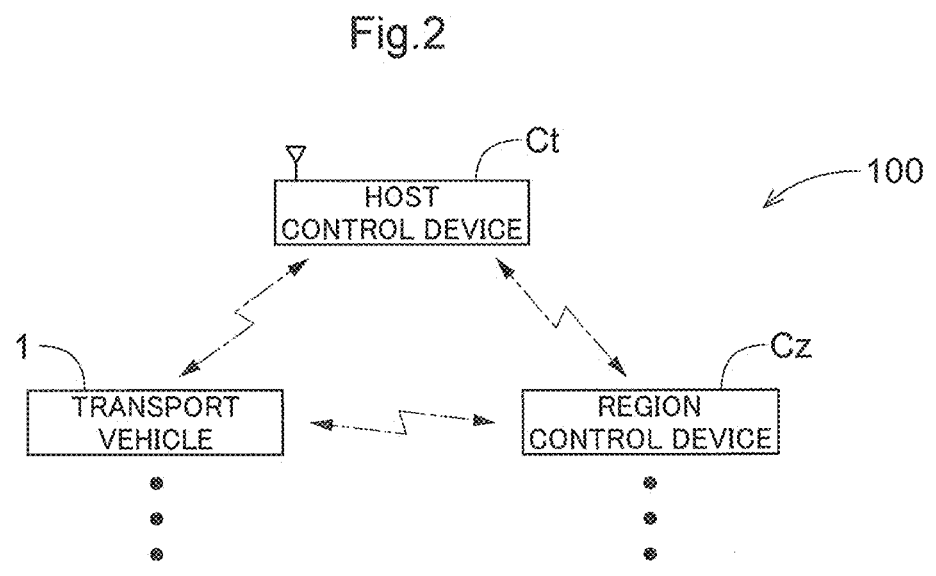

As shown in FIGS. 1 and 2, an article transport facility 100 includes transport vehicles 1 that transport articles, a travel route R along which the transport vehicles 1 travel, and a region control device Cz that controls the transport vehicles 1 in a predetermined branching and merging region Z (see FIG. 5) that includes a branching point Id where a portion of the travel route R branches and a merging point Ij where portions of the travel route R merge.

Although not illustrated in detail, in the present embodiment, the travel route R is divided into a plurality of control regions. The article transport facility 100 includes the same number of region control devices Cz as the number of control regions. In the present embodiment, each region control device Cz is configured to control the transport vehicles 1 in the corresponding control region. Each of the region control devices Cz may perform control with respect to one control region or a plurality of control regions. For example, one region control device Cz may be configured to control the transport vehicles 1 in a plurality of control regions.

In the present embodiment, the article transport facility 100 includes a host control device Ct. The host control device Ct controls the region control devices Cz. The transport vehicles 1, the region control devices Cz, and the host control device Ct are able to communicate with each other.

In the present embodiment, the article transport facility 100 includes a plurality of transport vehicles 1. Each of the transport vehicles 1 is configured to execute an assigned task based on a transport command received from the host control device Ct. In this example, the transport vehicles 1 are configured as overhead transport vehicles that travel near the ceiling. However, the transport vehicles 1 may be configured as floor transport vehicles that travel along the floor, for example.

Various types of articles are handled in the article transport facility 100. For example, in the case where the article transport facility 100 is used in a semiconductor manufacturing factory, the article is a wafer storage container (a so-called FOUP: Front Opening Unified Pod) that stores wafers, a reticle storage container (a so-called reticle pod) that stores reticles, or the like. In this case, the transport vehicles V transport articles such as wafer storage containers or reticle storage containers along the travel route R between processes.

The host control device Ct and the region control devices Cz each include a processor such as a microcomputer and peripheral circuits such as a memory, for example. Various types of processing and functions are realized by cooperation between such hardware and programs executed on the processor of a computer or the like. The article transport facility 100 is provided with a control system that includes at least the host control device Ct and the region control devices Cz. This control system may include other control devices in addition to the host control device Ct and the region control devices Cz. Note that the host control device Ct and the region control devices Cz may be configured as software realized using the same hardware.

The host control device Ct controls the transport vehicles 1 and the region control devices Cz. For example, the host control device Ct issues, to the transport vehicles 1, transport commands specifying a transport source and a transport destination for an article. The host control device Ct is able to communicate with the transport vehicles 1, and can be aware of the current positions of the transport vehicles 1 by receiving current position information regarding the transport vehicles 1 from the transport vehicles 1. Also, the host control device Ct is able to communicate with the region control devices Cz, and can be aware of the situation in the control regions by receiving status reports (reports on traffic conditions or the like) regarding the control regions from the region control devices Cz.

Each of the region control devices Cz controls transport vehicles 1 traveling in the corresponding control region. The transport vehicles 1 are controlled by the region control devices Cz as follows.

Figure 3:
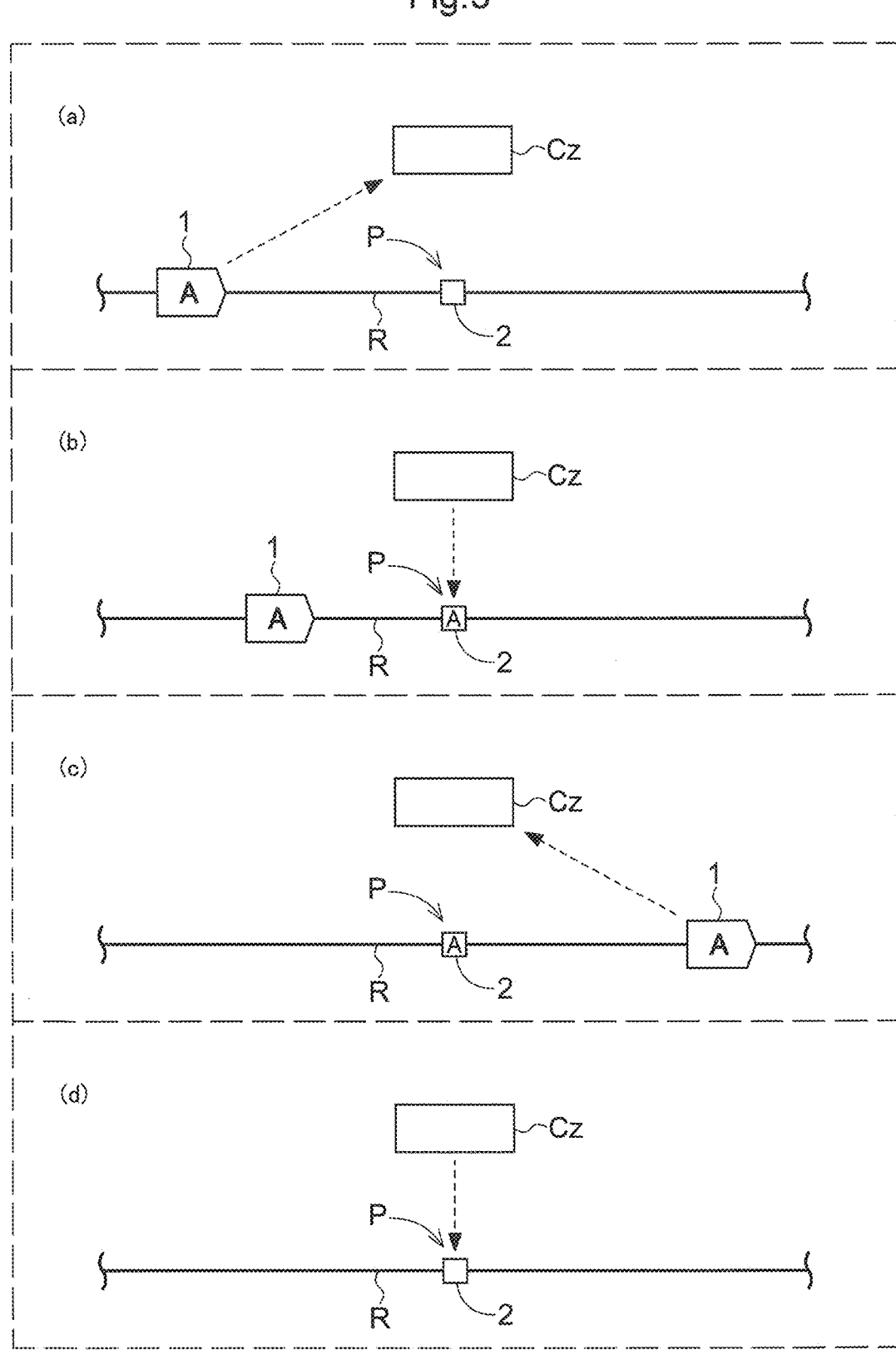
FIG. 3 is an illustrative diagram showing occupation permission and occupation permission revocation with respect to an occupation target point.

As shown in FIG. 3, occupation target points P, which are points occupiable by the transport vehicles 1, are provided at various locations on the travel route R. One occupation target point P is illustrated in FIG. 3. The region control device Cz controls the transport vehicles 1 by selectively giving the transport vehicles 1 permission to occupy the occupation target point P. In the present embodiment, a position information holder 2 that holds position information regarding the corresponding occupation target point P is installed at each of the occupation target points P. The transport vehicles 1 are able to read the position information holders 2 at the occupation target points P. Each of the transport vehicles 1 includes a reading device that reads the position information holders 2, and can recognize its own current position by reading the position information from a position information holder 2. Examples of the position information holder 2 include a one-dimensional code, a two-dimensional code, and a wireless tag.

As shown in (a) and (b) of FIG. 3, in response to a request from a transport vehicle 1, the region control device Cz permits the transport vehicle 1 to occupy the occupation target point P. Information indicating permission to occupy the occupation target point P is transmitted from the region control device Cz to the transport vehicle 1. Upon receiving such information, the transport vehicle 1 is able to pass through the occupation target point P for which occupation permission was given. On the other hand, transport vehicles 1 other than the transport vehicle 1 that was given permission to occupy the occupation target point P cannot occupy the occupation target point P in principle. Therefore, other transport vehicles 1 cannot pass through the occupation target point P.

As shown in (c) of FIG. 3, in the present embodiment, in response to a request from the transport vehicle 1, the region control device Cz revokes permission for the transport vehicle 1 to occupy the occupation target point P. In this example, after passing through the occupation target point P for which occupation permission was given, the transport vehicle 1 requests the region control device Cz to revoke the permission to occupy the occupation target point P.

As shown in (d) of FIG. 3, upon receiving a request to revoke the permission to occupy the occupation target point P from the transport vehicle 1, the region control device Cz revokes the permission to occupy the occupation target point P. As a result, the region control device Cz becomes able to accept another transport vehicle 1 at the occupation target point P. Note that, after revoking the permission to occupy the occupation target point P in response to the request from the transport vehicle 1, the region control device Cz notifies the transport vehicle 1 that the permission to occupy the occupation target point P was revoked.

Figure 5:
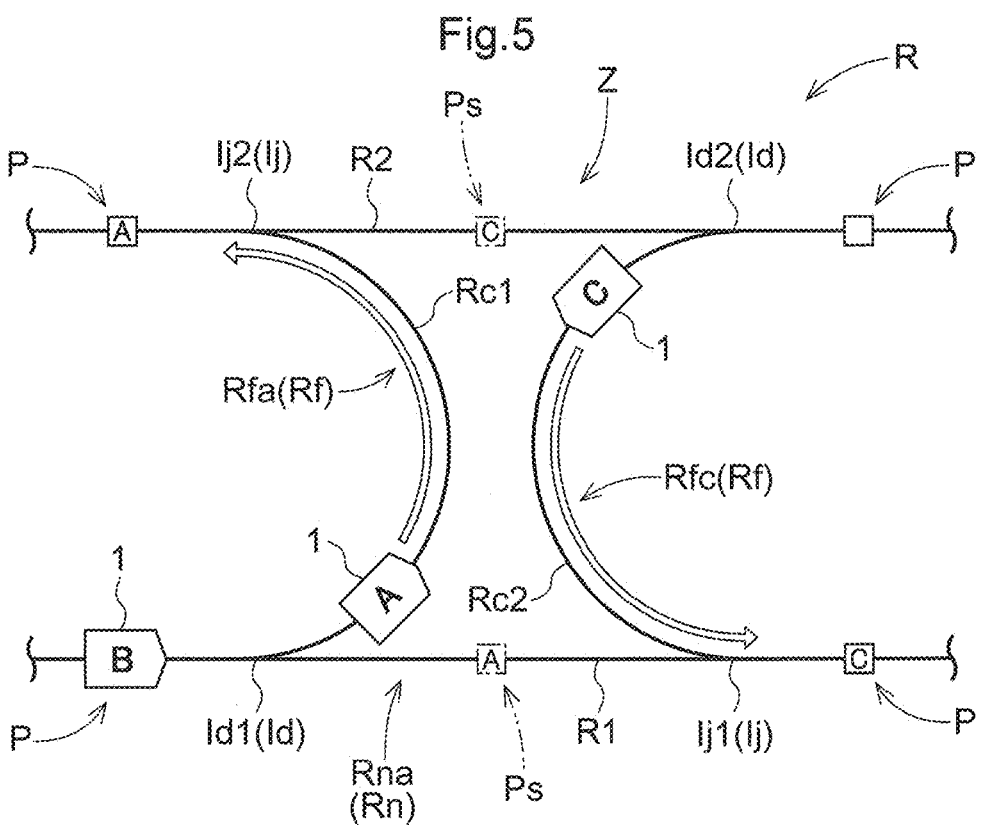
FIG. 5 is a diagram showing how a plurality of transport vehicles compete for an occupation target point or a secondary occupation target point.

In this way, the region control device Cz permits the one transport vehicle 1 to occupy the occupation target point P and prohibits occupation of the occupation target point P by other transport vehicles 1, thereby controlling the transport vehicles 1 so as to travel without interfering with each other in the branching and merging region Z in the corresponding control region (see FIG. 5). This will be described in detail later.

Issues in control in the branching and merging region Z will be described below with reference to a comparative example shown in FIG. 4.

Figure 4:
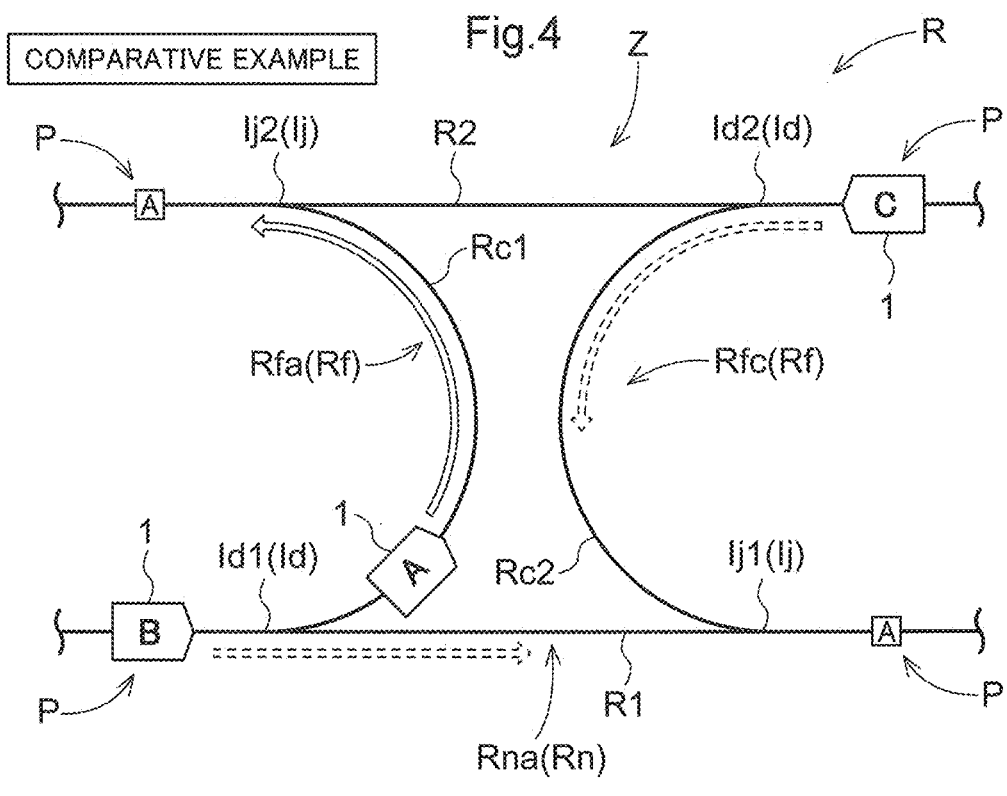
FIG. 4 is a diagram showing a comparative example.

FIG. 4 shows an example of the layout of the travel route R in the branching and merging region Z. The branching and merging region Z is a region that includes a branching point Id where a portion of the travel route R branches and a merging point Ij where portions of the travel route R merge.

The branching and merging region Z is provided with a first route R1 and a second route R2 that extend without intersecting with each other, a first connection route Rc1 that connects the first route R1 and the second route R2 to each other, and a second connection route Rc2 that connects the first route R1 and the second route R2 to each other at a location different from the first connection route Rc1.

The direction in which the transport vehicle 1 travels on the first route R1 and the direction in which the transport vehicle 1 travels on the second route R2 are set opposite to each other.

The first connection route Rc1 branches from the first route R1 at a first branching point Id1 (branching point Id). The first connection route Rc1 merges with the second route R2 at a second merging point Ij2 (merging point Ij).

The second connection route Rc2 branches from the second route R2 at a second branching point Id2 (branching point Id). The second connection route Rc2 merges with the first route R1 at a first merging point Ij1 (merging point Ij).

An occupation target point P occupiable by a transport vehicle 1 is provided at least downstream of each of the merging points Ij. In the present embodiment, occupation target points P are provided both upstream of the branching points Id and downstream of the merging points Ij. In the example shown in FIG. 4, occupation target points P are respectively set at a location upstream of the first branching point Id1, a location downstream of the first merging point Ij1, a location upstream of the second branching point Id2, and a location downstream of the second merging point Ij2. Note that "upstream" and "downstream" are defined based on the direction in which the transport vehicles 1 travel.

In FIG. 4, a case is illustrated in which transport vehicles 1 (specifically, a transport vehicle A, a transport vehicle B, and a transport vehicle C) travel in a branching and merging region Z.

In order to travel from the first route R1 to the second route R2 via the first connection route Rc1, the transport vehicle A requests the region control device Cz for permission to occupy the occupation target point P that is downstream of the second merging point Ij2 where the first connection route Rc1 and the second route R2 merge with each other. This is occupation permission for the transport vehicle A to travel on a scheduled travel route Rf.

In addition to this, the transport vehicle A requests the region control device Cz for permission to occupy the occupation target point P that would be passed through in the case of traveling straight along the first route R1, which in this example is the occupation target point P located downstream of the first merging point Ij1. Accordingly, a subsequent transport vehicle B that is scheduled to travel straight along the first route R1 can be stopped at least at the occupation target point P located upstream of the first branching point Id1. In other words, due to the preceding transport vehicle A occupying the occupation target point P, the next destination of the subsequent transport vehicle B cannot be determined, and thus the transport vehicle B cannot travel further, and instead stops. According to this configuration, it is possible to avoid the case where the subsequent transport vehicle B scheduled to travel straight along the first route R1 collides with the rear end of the preceding transport vehicle A traveling along the first route R1 or the first connection route Rc1.

In this way, in the case where the transport vehicles A and B are traveling along the first route R1, in order to avoid a rear-end collision with the subsequent transport vehicle B, the preceding transport vehicle A requests permission to occupy the occupation target point P on the scheduled travel route Rf and also the occupation target point P on a non-scheduled travel route Rn that branches in a different direction from the scheduled travel route Rf.

In the above case, the occupation target point P for which occupation permission was given to the transport vehicle A and that is located downstream of the first merging point Ij1 is also the occupation target point P for which the transport vehicle C needs occupation permission in order to travel from the second route R2 to the first route R1 via the second connection route Rc2. However, since occupation permission for that occupation target point P has been given to the transport vehicle A, the transport vehicle C cannot travel forward, and instead stops. In this way, regardless of the fact that there is a low possibility of interference between the transport vehicle A scheduled to travel along the first connection route Rc1 and the transport vehicle C scheduled to travel along the second connection route Rc2, if occupation permission for an occupation target point P is given to either one of the transport vehicles 1 (the transport vehicle A in the example shown in FIG. 4), the traveling of the other transport vehicle 1 (the transport vehicle C in the example shown in FIG. 4) will be hindered. This is an issue in control performed in the branching and merging region Z.

FIG. 5 shows an example of the layout of the travel route R in the branching and merging region Z in the article transport facility 100 according to the present disclosure. The layout of the travel route R is similar to that shown in FIG. 4.

As shown in FIG. 5, a secondary occupation target point Ps, for which secondary occupation permission is given to a transport vehicle 1, is provided between the branching point Id and the merging point Ij on the travel route R. In this example, at least one secondary occupation target point Ps is provided between the first branching point Id1 and the first merging point Ij1 on the first route R1. Furthermore, at least one secondary occupation target point Ps is provided between the second branching point Id2 and the second merging point Ij2 on the second route R2. The first route R1 and on the second route R2 may each be provided with a plurality of secondary occupation target points Ps. The occupation target point P and the secondary occupation target point Ps are target points for which occupation permission is given to the transport vehicles 1. In other words, the target points include the occupation target point P and the secondary occupation target point Ps. The occupation target point P is a point for which occupation permission is to be given to a transport vehicle 1, and the secondary occupation target point Ps is a point for which secondary occupation permission is to be given to a transport vehicle 1.

In the case where a transport vehicle 1 is scheduled to pass through the branching point Id and then pass through the merging point Ij while passing through the branching and merging region Z, the region control device Cz gives the transport vehicle 1 occupation permission for whichever one of the occupation target point P and the secondary occupation target point Ps is closest to the branching point Id on the scheduled travel route Rf that branches from the branching point Id and is to be traveled by the transport vehicle 1 after passing through the branching point Id, and also occupation permission for whichever one of the occupation target point P and the secondary occupation target point Ps is closest to the branching point Id on the non-scheduled travel route Rn that branches from the branching point Id in a different direction from the scheduled travel route Rf.

In the example shown in FIG. 5, the region control device Cz gives the transport vehicle A both occupation permission for the occupation target point P on a scheduled travel route Rfa of the transport vehicle A (the scheduled travel route Rf along which the transport vehicle A is scheduled to travel) and occupation permission for the secondary occupation target point Ps on a non-scheduled travel route Rna of the transport vehicle A (the non-scheduled travel route Rn along which the transport vehicle A is not scheduled to travel). As a result, it is possible to cause the subsequent transport vehicle B to stop in order to avoid a rear-end collision with transport vehicle A, and the occupation target point P downstream of the first merging point Ij1 can remain in the non-occupied state for the transport vehicle C that is scheduled to travel from the second route R2 to the first route R1 via the second connection route Rc2. Accordingly, the transport vehicle C can obtain occupation permission for the occupation target point P on a scheduled travel route Rfc (the scheduled travel route Rf along which the transport vehicle C is scheduled to travel) without being influenced by the occupation permission given to the transport vehicle A for the occupation target point P. In other words, according to this configuration, it is possible to reduce the number of zones for which occupation permission is given to a certain transport vehicle 1 in the branching and merging region Z, and when another transport vehicle 1 is scheduled to pass through the branching and merging region Z, an occupiable zone can be more easily ensured for the other transport vehicle 1. Therefore, it is easier to enable a plurality of transport vehicles 1 to pass through the branching and merging region Z at the same time.

In the present embodiment, the secondary occupation target point Ps is configured as information indicating the position of the secondary occupation target point Ps. In this example, the secondary occupation target point Ps is an element that does not physically exist, but rather exists only on map data. In contrast with the occupation target point P whose placement position is constrained by the environment of the travel route R, for example, the secondary occupation target point Ps, which is configured as mere information, is less constrained in terms of placement position. Therefore, the usage of the secondary occupation target point Ps, whose placement position is less constrained, is likely to contribute to reducing the number of zones for which occupation permission is given to a certain transport vehicle 1 in the branching and merging region Z.

The transport vehicle 1 stores map data regarding the travel route R in advance, or receives the map data from the host control device Ct or a region control device Cz. Therefore, the transport vehicle 1 is able to specify the positions of all secondary occupation target points Ps set on the travel route R. For example, the transport vehicle 1 can detect a relative position of the transport vehicle 1 relative to a secondary occupation target point Ps based on the current position of the transport vehicle 1 specified using GPS (Global Positioning System) or a beacon, or the distance traveled by the transport vehicle 1 from a known position when reading the position information holder 2 at a specific occupation target point P. In other words, the transport vehicle 1 is able to recognize the secondary occupation target point Ps based on the current position of the transport vehicle 1.

Figure 6:
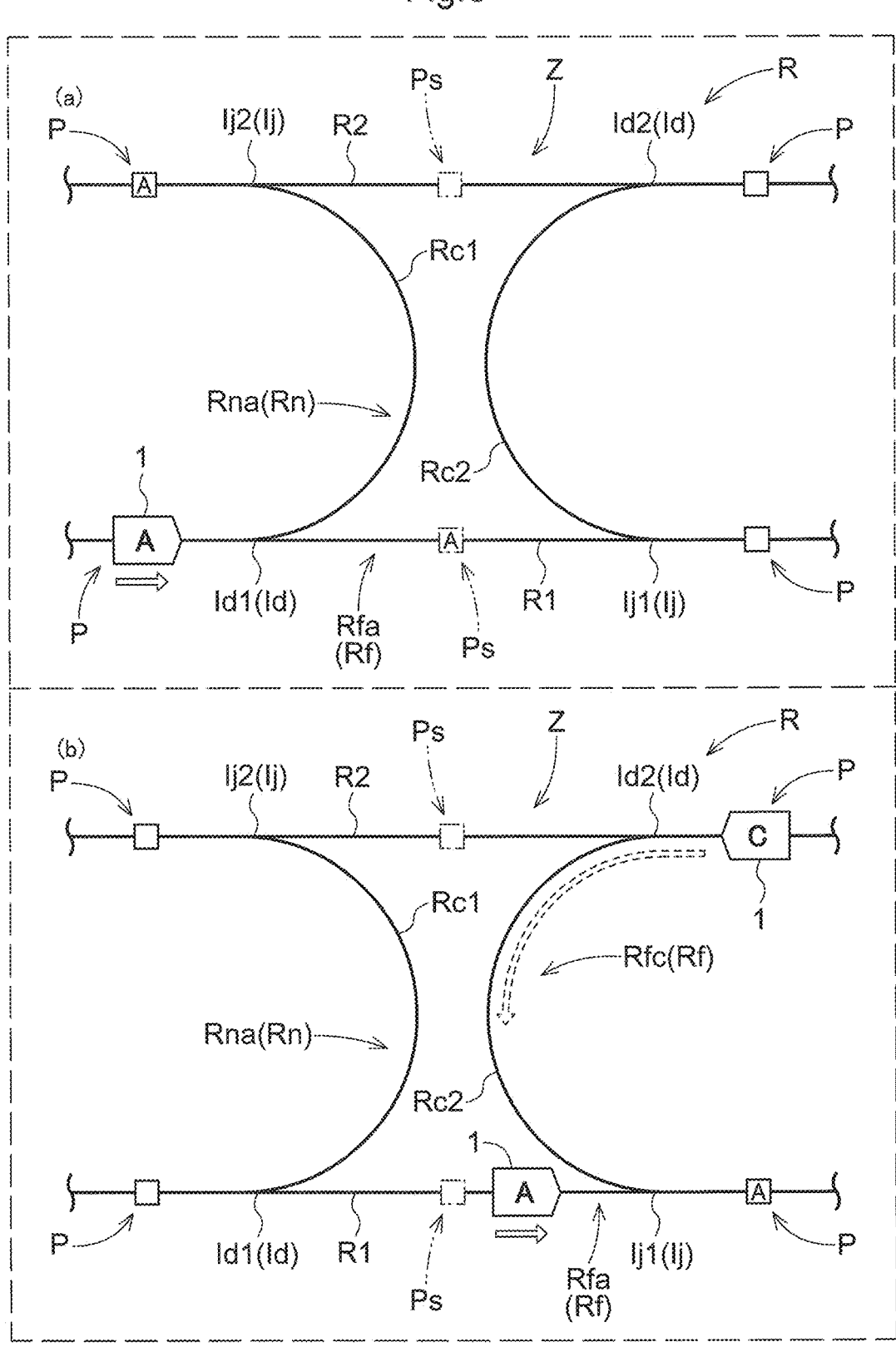
FIG. 6 is a diagram showing timings when a transport vehicle requests occupation permission and occupation permission revocation with respect to an occupation target point or a secondary occupation target point.

As shown in FIG. 6, in the present embodiment, in the case where the scheduled travel route Rf includes a secondary occupation target point Ps and an occupation target point P, the transport vehicle 1 requests the region control device Cz for occupation permission for the secondary occupation target point Ps and the occupation target point P at timings in an order corresponding to the order in which the transport vehicle 1 passes through the target points, and the transport vehicle 1 requests the region control device Cz to revoke occupation permission for the secondary occupation target point Ps and the occupation target point P at timings in an order corresponding to the order in which the transport vehicle 1 passed through the target points. In the present embodiment, each time the transport vehicle 1 passes through a secondary occupation target point Ps or an occupation target point P, the transport vehicle 1 requests the region control device Cz to revoke occupation permission for the secondary occupation target point Ps or the occupation target point P that was passed. After (preferably, immediately after) passing a secondary occupation target point Ps or an occupation target point P, the transport vehicle 1 requests the region control device Cz to revoke occupation permission for the secondary occupation target point Ps or the occupation target point P that was passed. With this configuration, in the branching and merging region Z, occupation permission for zones can be given and revoked in stages in accordance with how the transport vehicle 1 travels. Therefore, in the branching and merging region Z, an occupiable zone can be more easily ensured for another transport vehicle 1.

FIG. 6 shows a case where the transport vehicle A travels straight along the first route R1. In this case, the scheduled travel route Rfa of the transport vehicle A is the first route R1. In the case of traveling along the first route R1, which is the scheduled travel route Rfa, the transport vehicle A first passes through the secondary occupation target point Ps on the first route R1, and then passes through an occupation target point P downstream of the first merging point Ij1.

As shown in (a) of FIG. 6, the transport vehicle A requests the region control device Cz for occupation permission for the secondary occupation target point Ps on the first route R1. The region control device Cz gives the transport vehicle A occupy permission for the secondary occupation target point Ps. Also, in order to avoid a rear-end collision with another subsequent transport vehicle 1, the transport vehicle A also requests occupation permission for the occupation target point P on the non-scheduled travel route Rna (the occupation target point P downstream of the second merging point Ij2), and the region control device Cz gives the transport vehicle A occupation permission for that occupation target point P.

As shown in (b) of FIG. 6, after passing through the secondary occupation target point Ps on the first route R1, the transport vehicle A requests the region control device Cz to revoke occupation permission for that secondary occupation target point Ps. The region control device Cz thus revokes occupation permission for the secondary occupation target point Ps. Before that, the transport vehicle A has requested the region control device Cz for occupation permission for the occupation target point P located downstream of the first merging point Ij1. The region control device Cz has given the transport vehicle A occupation permission for the occupation target point P. Although not illustrated in detail, after passing through the occupation target point P located downstream of the first merging point Ij1, the transport vehicle A requests the region control device Cz to revoke occupation permission for that occupation target point P. The region control device Cz thus revokes occupation permission for the occupation target point P. Note that in the example shown in (b) of FIG. 6, after passing through the secondary occupation target point Ps on the first route R1, the transport vehicle A also requests revocation of occupation permission for the occupation target point P on the non-scheduled travel route Rna, and the region control device Cz thus revokes occupation permission for that occupation target point P.

In the present embodiment, in the case where the transport vehicle 1 receives occupation permission for a secondary occupation target point Ps, the transport vehicle 1 passes through the secondary occupation target point Ps if occupation permission for the occupation target point P downstream of the secondary occupation target point Ps has not been given to another transport vehicle 1.

In the example shown in (b) of FIG. 6, the occupation target point P located downstream of the first merging point Ij1 is also the occupation target point P for which occupation permission is to be given to the transport vehicle C that is scheduled to travel from the second route R2 to the first route R1 via the second connection route Rc2. However, occupation permission for that occupation target point P has already been given to the transport vehicle A, and is not held by the transport vehicle C. Therefore, instead of stopping at the secondary occupation target point Ps on the first route R1, the transport vehicle A passes that secondary occupation target point Ps, and continues to travel toward the occupation target point P downstream of the first merging point Ij1.

In the present embodiment, in the case where the transport vehicle 1 receives occupation permission for a secondary occupation target point Ps, the transport vehicle 1 stops at the secondary occupation target point Ps if occupation permission for the occupation target point P downstream of that secondary occupation target point Ps has been given to another transport vehicle 1.

Figure 7:
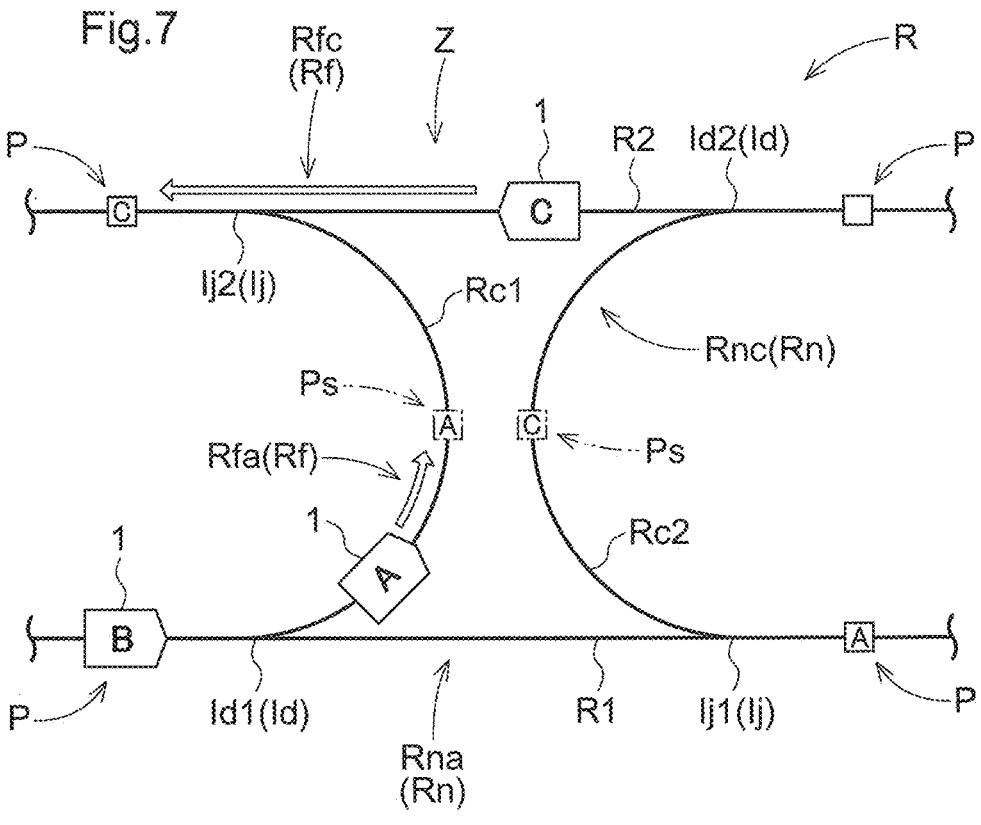
FIG. 7 is a diagram showing a case where a transport vehicle stops at a secondary occupation target point.

FIG. 7 shows an example in which the first connection route Rc1 and the second connection route Rc2 are each provided with a secondary occupation target point Ps. In the example shown in FIG. 7, the connection routes Rc1 and Rc2 are each provided with one secondary occupation target point Ps, but a plurality of secondary occupation target points Ps may be provided in each. As shown in FIG. 7, the occupation target point P located downstream of the second merging point Ij2 is an occupation target point P for which occupation permission is to be given to both the transport vehicle A scheduled to travel from the first route R1 to the second route R2 via the first connection route Rc1 and the transport vehicle C scheduled to travel straight along the second route R2. In the illustrated example, occupation permission for this occupation target point P has been given to the transport vehicle C. In other words, since occupation permission for the occupation target point P downstream of the secondary occupation target point Ps on the first connection route Rc1, which is the scheduled travel route Rfa of the transport vehicle A, has been given to the transport vehicle C, the transport vehicle A stops at the secondary occupation target point Ps. After occupation permission for the occupation target point P has been revoked from the transport vehicle C, the transport vehicle A requests the region control device Cz for occupation permission for the occupation target point P. After receiving occupation permission for the occupation target point P, the transport vehicle A starts to travel toward the occupation target point P.

Figure 8:
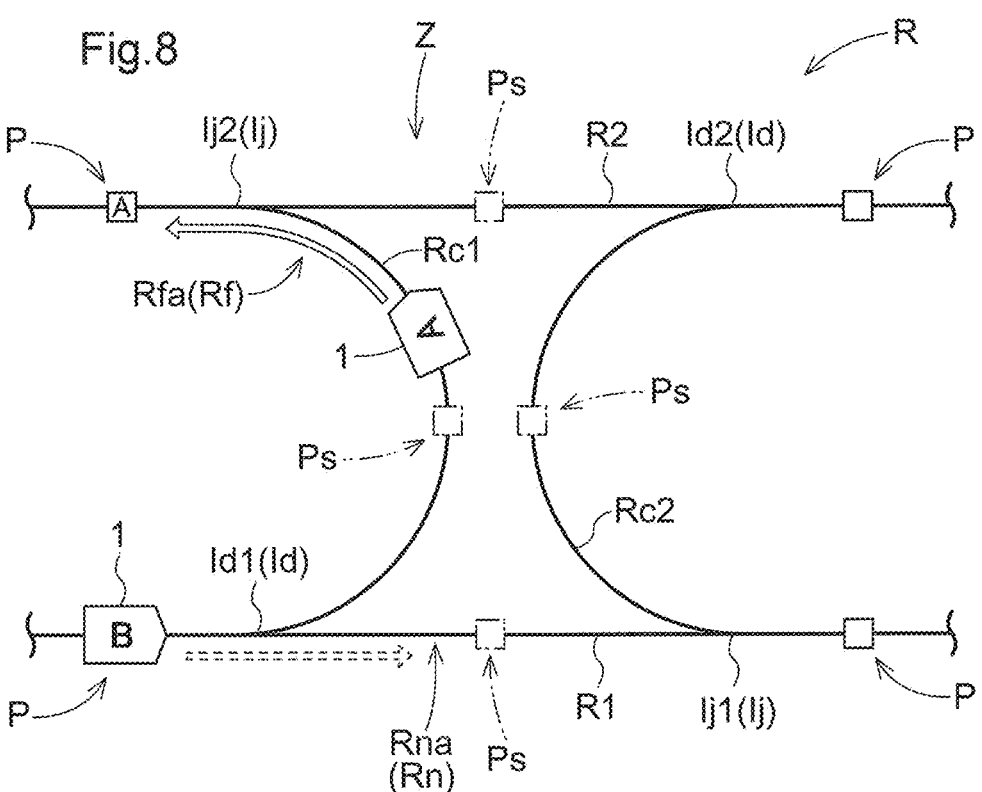
FIG. 8 is a diagram showing a timing of revocation of occupation permission with respect to a secondary occupation target point.

FIG. 8 shows an example in which the first route R1, the second route R2, the first connection route Rc1, and the second connection route Rc2 are each provided with a secondary occupation target point Ps. In the example shown in FIG. 8, the first route R1, the second route R2, the first connection route Rc1, and the second connection route Rc2 are each provided with one secondary occupation target point Ps, but a plurality of secondary occupation target points Ps may be provided in each.

In the present embodiment, in the case where the scheduled travel route Rf includes a secondary occupation target point Ps and an occupation target point P arranged in the stated order, and furthermore the non-scheduled travel route Rn includes a secondary occupation target point Ps and an occupation target point P arranged in the stated order, the transport vehicle 1 first passes through the secondary occupation target point Ps on the scheduled travel route Rf, and then requests the region control device Cz to revoke occupation permission for the secondary occupation target points Ps on the scheduled travel route Rf and the non-scheduled travel route Rn.

In the example shown in FIG. 8, the transport vehicle A is scheduled to travel from the first route R1 to the second route R2 via the first connection route Rc1. In other words, in this example, the scheduled travel route Rfa of the transport vehicle A is the portion of the route along the first connection route Rc1 downstream of the first branching point Id1 and the second route R2. The non-scheduled travel route Rna of the transport vehicle A is the portion of the first route R1 downstream of the first branching point Id1. In the case where a secondary occupation target point Ps and an occupation target point P are arranged in the stated order in the scheduled travel route Rfa of the transport vehicle A, and a secondary occupation target point Ps and an occupation target point P are arranged in the stated order in the non-scheduled travel route Rna, the transport vehicle A first passes through the secondary occupation target point Ps on the scheduled travel route Rfa, and then requests the region control device Cz to revoke occupation permission for the secondary occupation target points Ps on the scheduled travel route Rfa and the non-scheduled travel route Rna. In this example, while (or immediately after) passing through the secondary occupation target point Ps on the scheduled travel route Rfa, the transport vehicle A requests the region control device Cz to revoke occupation permission for the secondary occupation target point Ps on the scheduled travel route Rfa and the secondary occupation target point Ps on the non-scheduled travel route Rna. As a result, occupation permission for the secondary occupation target point Ps on the non-scheduled travel route Rna can be revoked from the transport vehicle A at an earlier time, and permission to travel on the non-scheduled travel route Rna can be given to the subsequent transport vehicle B, which travels after the transport vehicle A, at an earlier time.

According to the article transport facility 100 described above, it is possible to reduce the number of zones for which occupation permission is given to a transport vehicle 1 in the branching and merging region Z, and when another transport vehicle 1 is scheduled to pass through the branching and merging region Z, an occupiable zone can be more easily ensured for the other transport vehicle 1. This makes it possible to increase the degree of freedom of travel of the transport vehicles 1 in a zone where portions of the travel route R intersect each other, and to improve the transport efficiency of the article transport facility 100 as a whole.

Other Embodiments

Next, other embodiments will be described.

Figure 9:
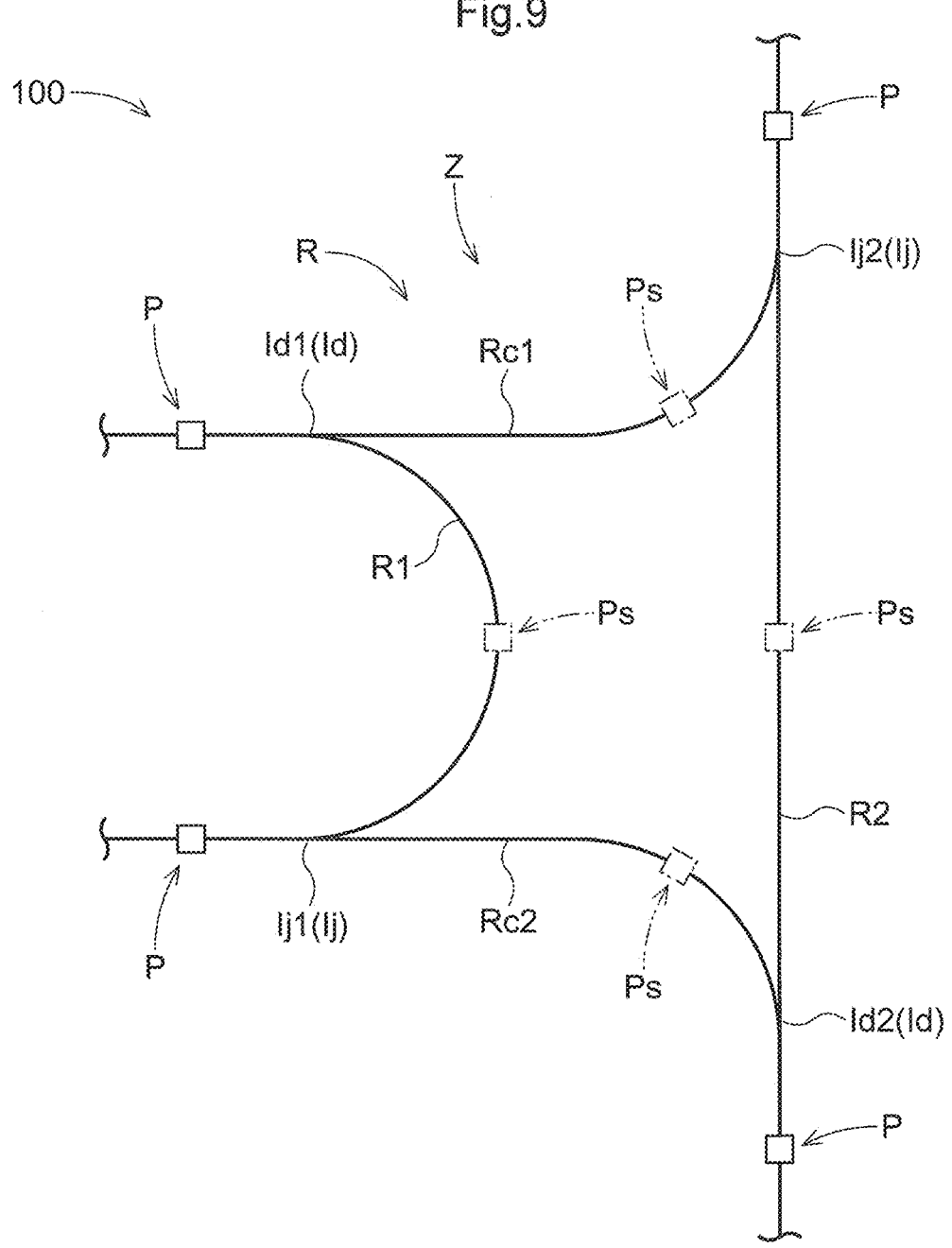
FIG. 9 is a diagram showing a travel route layout in another embodiment.

(1) In the above embodiment, an example is described in which the branching and merging region Z is provided with the first route R1 and the second route R2 that extend without intersecting with each other, the first connection route Rc1 that connects the first route R1 and the second route R2 to each other, and the second connection route Rc2 that connects the first route R1 and the second route R2 to each other at a location different from the first connection route Rc1. Such a branching and merging region Z may also be provided in a bay connection route that connects bays to each other, as shown in FIG. 9, for example. In the example shown in FIG. 9, the first route R1, the second route R2, the first connection route Rc1, and the second connection route Rc2 are each provided with a secondary occupation target point Ps. However, the present invention is not limited to this, and a secondary occupation target point Ps can be provided at any location that is between a branching point Id and a merging point Ij in the travel route R.

(2) In the above embodiment, an example is described in which the secondary occupation target point Ps is configured as information indicating the position of the secondary occupation target point Ps. However, the present invention is not limited to this example, and the secondary occupation target point Ps may be provided with a position information holder 2 that holds position information regarding the secondary occupation target point Ps, similarly to the occupation target point P.

(3) In the above embodiment, an example is described in which, in the case where the scheduled travel route Rf includes a secondary occupation target point Ps and an occupation target point P, the transport vehicle 1 requests the region control device Cz for occupation permission for the secondary occupation target point Ps and the occupation target point P at timings in an order corresponding to the order in which the transport vehicle 1 passes through the target points. However, the present invention is not limited to this example, and the transport vehicle 1 may request the region control device Cz for occupation permission for the secondary occupation target point Ps and the occupation target point P at approximately the same time.

(4) In the above embodiment, an example is described in which the transport vehicle 1 requests the region control device Cz to revoke occupation permission for the secondary occupation target point Ps and the occupation target point P at timings in an order corresponding to the order in which the transport vehicle 1 passes through the target points. However, the present invention is not limited to this example, and the transport vehicle 1 may request the region control device Cz to revoke occupation permission for the secondary occupation target point Ps and the occupation target point P at approximately the same time.

(5) In the above embodiment, an example is described in which, after passing through the secondary occupation target point Ps on the scheduled travel route Rf, the transport vehicle 1 requests the region control device Cz to revoke occupation permission for the secondary occupation target points Ps on the scheduled travel route Rf and the non-scheduled travel route Rn. However, the present invention is not limited to this example, and the transport vehicle 1 may request the region control device Cz to revoke occupation permission for the secondary occupation target point Ps on the non-scheduled travel route Rn before passing through the secondary occupation target point Ps on the scheduled travel route Rf. In this case, the timing at which the transport vehicle 1 requests revocation of occupancy permission is preferably a timing that enables avoiding a rear-end collision with another transport vehicle 1 that travels behind the transport vehicle 1. Specifically, it is preferable that the transport vehicle 1 requests revocation of occupancy permission at the timing when the inter-vehicle distance between the transport vehicle 1 and the subsequent transport vehicle 1 is a sufficiently long distance.

(6) It should be noted that the configurations disclosed in the above-described embodiments can also be applied in combination with configurations disclosed in other embodiments as long as no contradiction arises. Regarding such other configurations as well, the embodiments disclosed in this specification are merely examples in all respects. Therefore, various modifications can be made as appropriate without departing from the spirit of the present disclosure.

Overview of Embodiments

The following is an overview of embodiments of the present invention.

An article transport facility according to an aspect includes:
  a transport vehicle configured to transport an article;
  a travel route along which the transport vehicle is travelable; and
  a region control device configured to control the transport vehicle in a predetermined branching and merging region including a branching point where a portion of the travel route branches and a merging point where portions of the travel route merge,
  the travel route including:
    an occupation target point, for which occupation permission is to be given to the transport vehicle, at least downstream of the merging point; and
    a secondary occupation target point, for which occupation permission is secondarily given to the transport vehicle, between the branching point and the merging point in the travel route,
  wherein in response to the transport vehicle being scheduled to sequentially pass through the branching point and pass through the merging point while passing through the branching and merging region, the region control device gives the transport vehicle (i) occupation permission for a first target point on a scheduled travel route, which branches from the branching point and is to be traveled by the transport vehicle after passing through the branching point, and (ii) occupation permission for a second target point on a non-scheduled travel route, which branches from the branching point in a different direction from the scheduled travel route, the first target point and the second target point each being whichever one of the occupation target point and the secondary occupation target point is closest to the branching point.

According to this configuration, when the transport vehicle is scheduled to pass through the branching and merging region, for both the scheduled travel route and the non-scheduled travel route that branch from the branching point in different directions, the region control device gives the transport vehicle occupation permission for whichever one of the occupation target point and the secondary occupation target point is closest to the branching point. Accordingly, it is possible to reduce the number of zones for which occupation permission is given to the transport vehicle in the branching and merging region, and when another transport vehicle is scheduled to pass through the branching and merging region, an occupiable zone can be more easily ensured for the other transport vehicle. Therefore, it is easier to enable a plurality of transport vehicles to pass through the branching and merging region at the same time. In this way, according to the above configuration, it is possible to increase the degree of freedom of travel of the transport vehicles in a zone where portions of the travel route intersect each other, and to improve the transport efficiency of the article transport facility as a whole.

It is preferable that the article transport facility further includes a position information holder configured to be disposed at the occupation target point and hold position information regarding the occupation target point, wherein the secondary occupation target point is configured as information indicating a position of the secondary occupation target point, and the transport vehicle is further configured to read the position information holder at the occupation target point and recognize the secondary occupation target point based on a current position of the transport vehicle.

According to this configuration, the secondary occupation target point is configured as information indicating a position of the secondary occupation target point. Accordingly, the secondary occupation target point can be an element that does not physically exist, but rather exists only on map data, for example. In contrast with the occupation target point whose placement position is constrained by the environment of the travel route, for example, the secondary occupation target point, which is configured as mere information, is less constrained in terms of placement position. Therefore, using the secondary occupation target point, whose placement position is less constrained, is likely to contribute to reducing the number of zones for which occupation permission is given to a certain transport vehicle in the branching and merging region.

It is preferable that in response to the scheduled travel route including the secondary occupation target point and the occupation target point, the transport vehicle requests the region control device for occupation permission for the secondary occupation target point and the occupation target point at timings in an order corresponding to an order in which the transport vehicle passes through the secondary occupation target point and the occupation target point, and the transport vehicle requests the region control device to revoke occupation permission for the secondary occupation target point and the occupation target point at timings in an order corresponding to an order in which the transport vehicle passed through the secondary occupation target point and the occupation target point.

According to this configuration, in the branching and merging region, occupation permission for zones can be given and revoked in stages in accordance with how the transport vehicle travels. Therefore, an occupiable zone can be more easily ensured for another transport vehicle.

It is preferable that in response to (i) the scheduled travel route including the secondary occupation target point and the occupation target point arranged in recited order, and furthermore (ii) the non-scheduled travel route including the secondary occupation target point and the occupation target point arranged in recited order, the transport vehicle first passes through the secondary occupation target point on the scheduled travel route, and then requests the region control device to revoke occupation permission for the secondary occupation target points on the scheduled travel route and the non-scheduled travel route.

According to this configuration, occupation permission for the secondary occupation target point on the non-scheduled travel route can be revoked from the transport vehicle at an earlier time, and permission to travel on the non-scheduled travel route can be given to another transport vehicle at an earlier time.

It is preferable that the transport vehicle stops at the secondary occupation target point if occupation permission for an occupation target point downstream of the secondary occupation target point has been given to another transport vehicle.

According to this configuration, the transport vehicle can travel to the secondary occupation target point on the scheduled travel route regardless of the presence or absence of another transport vehicle scheduled to travel in a region ahead of the scheduled travel route. Therefore, according to the above configuration, a plurality of transport vehicles can more easily travel smoothly in the branching and merging region.

INDUSTRIAL APPLICABILITY

The technology according to the present disclosure is applicable to an article transport facility that includes transport vehicles that transport articles, a travel route along which the transport vehicles travel, and a region control device that controls the transport vehicles in a predetermined branching and merging region.

What is claimed is:

1. A method of control for an article transport facility, the article transport facility comprising:

a transport vehicle configured to transport an article;

a travel route along which the transport vehicle is travelable; and a region control device configured to control the transport vehicle in a predetermined branching and merging region comprising a branching point where a portion of the travel route branches and a merging point where portions of the travel route merge, the travel route comprising:

an occupation target point, for which occupation permission is to be given to the transport vehicle, at least downstream of the merging point; and a secondary occupation target point, for which occupation permission is secondarily given to the transport vehicle, between the branching point and the merging point in the travel route, and wherein in response to the transport vehicle being scheduled to sequentially pass through the branching point and pass through the merging point while passing through branching and merging region, the region control device gives the transport vehicle (i) occupation permission for a first target point on a scheduled travel route, which branches from the branching point and is to be traveled by the transport vehicle after passing through the branching point, and (ii) occupation permission for a second target point on a non-scheduled travel route, which branches from the branching point in a different direction from the scheduled travel route, the first target point and the second target point each being whichever one of the occupation target point and the secondary occupation target point is closest to the branching point.

2. The method of claim 1,
wherein the transport vehicle is further configured to read the position information holder at the occupation target point and to recognize the secondary occupation target point based on a current position of the transport vehicle, and
wherein the position information holder is configured to be disposed at the occupation target point and hold position information regarding the occupation target point.

3. The method of claim 1,
wherein in response to the scheduled travel route including the secondary occupation target point and the occupation target point, the transport vehicle requests the region control device for occupation permission for the secondary occupation target point and the occupation target point at timings in an order corresponding to an order in which the transport vehicle passes through the secondary occupation target point and the occupation target point, and the transport vehicle requests the region control device to revoke occupation permission for the secondary occupation target point and the occupation target point at timings in an order corresponding to an order in which the transport vehicle passed through the secondary occupation target point and the occupation target point.

4. The method of claim 1,
wherein in response to (i) the scheduled travel route including the secondary occupation target point and the occupation target point arranged in recited order, and furthermore (ii) the non-scheduled travel route including the secondary occupation target point and the occupation target point arranged in recited order, the transport vehicle first passes through the secondary occupation target point on the scheduled travel route, and then requests the region control device to revoke occupation permission for the secondary occupation target points on the scheduled travel route and the non-scheduled travel route.

5. The method of claim 1,
wherein the transport vehicle stops at the secondary occupation target point if occupation permission for an occupation target point downstream of the secondary occupation target point has been given to another transport vehicle.

* * * * *